United States Patent
Peterson et al.

(10) Patent No.: US 10,248,189 B2
(45) Date of Patent: Apr. 2, 2019

(54) PRESENTATION OF VIRTUAL REALITY OBJECT BASED ON ONE OR MORE CONDITIONS

(71) Applicant: Lenovo (Singapore) Pte. Ltd., New Tech Park (SG)

(72) Inventors: Nathan J. Peterson, Oxford, NC (US); Arnold S. Weksler, Raleigh, NC (US); Aaron Michael Stewart, Raleigh, NC (US); John Carl Mese, Cary, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/223,171

(22) Filed: Jul. 29, 2016

(65) Prior Publication Data
US 2018/0032125 A1  Feb. 1, 2018

(51) Int. Cl.
| | |
|---|---|
| *G06T 19/00* | (2011.01) |
| *G06F 3/01* | (2006.01) |
| *G06F 3/16* | (2006.01) |
| *G06K 9/00* | (2006.01) |

(52) U.S. Cl.
CPC ............. *G06F 3/011* (2013.01); *G06F 3/012* (2013.01); *G06F 3/013* (2013.01); *G06F 3/017* (2013.01); *G06F 3/167* (2013.01); *G06K 9/00335* (2013.01); *G06T 19/006* (2013.01); *G06T 2200/04* (2013.01)

(58) Field of Classification Search
None
See application file for complete search history.

(56) References Cited

U.S. PATENT DOCUMENTS

| | | | |
|---|---|---|---|
| 6,232,972 B1 | 5/2001 | Arcuri et al. | |
| 2003/0122787 A1 | 7/2003 | Zimmerman et al. | |
| 2009/0309886 A1* | 12/2009 | Sneed | G06F 3/14 345/520 |
| 2012/0194418 A1* | 8/2012 | Osterhout | G02B 27/0093 345/156 |
| 2014/0247208 A1* | 9/2014 | Henderek | G06F 3/0481 345/156 |
| 2015/0193018 A1* | 7/2015 | Venable | G06F 3/0346 345/158 |
| 2015/0372832 A1* | 12/2015 | Kortz | G05B 15/02 700/278 |
| 2016/0313902 A1* | 10/2016 | Hill | G06F 3/04847 |

FOREIGN PATENT DOCUMENTS

CN          104460330 A       3/2015

\* cited by examiner

*Primary Examiner* — Peter Hoang
(74) *Attorney, Agent, or Firm* — John L. Rogitz; John M. Rogitz

(57) ABSTRACT

In one aspect, an apparatus includes a housing, a processor coupled to the housing, a display coupled to the housing and accessible to the processor, and storage coupled to the housing and accessible to the processor. The storage bears instructions executable by the processor to determine that at least one condition is satisfied for presentation of a virtual reality object to control a device different from the apparatus. The instructions are also executable by the processor to present the virtual reality object on the display responsive to the determination.

17 Claims, 7 Drawing Sheets

PRESENTATION OF VIRTUAL REALITY OBJECT BASED ON ONE OR MORE CONDITIONS

FIELD

The present application relates generally to presentation of a virtual reality object on a display based on one or more conditions being satisfied.

BACKGROUND

As recognized herein, certain controls for controlling devices and appliances in a residence or building may not always be in a convenient location relative to a current location of a user. This can be frustrating to the user.

SUMMARY

Accordingly, in one aspect an apparatus includes a housing, a processor coupled to the housing, a display coupled to the housing and accessible to the processor, and storage coupled to the housing and accessible to the processor. The storage bears instructions executable by the processor to determine that at least one condition is satisfied for presentation of a virtual reality object to control a device different from the apparatus. The instructions are also executable by the processor to present the virtual reality object on the display responsive to the determination.

In another aspect, a method includes determining that at least one condition is satisfied for presentation of a virtual reality object on a display of a first device, where the virtual reality object is interactable to control output from a second device. The method also includes presenting the virtual reality object on the display responsive to the determining, identifying user interaction with the virtual reality object, and controlling output from the second device responsive to the identifying.

In still another aspect, an apparatus includes a first processor, a network adapter, and storage. The storage bears instructions executable by a second processor for determining that at least one condition is satisfied for presentation, on a display of an apparatus, of a virtual reality object to control a device different from the apparatus. The instructions are also executable by the second processor for presenting, based on the determining, the virtual reality object on the display. The first processor transfers the instructions to the second processor over a network via the network adapter.

The details of present principles, both as to their structure and operation, can best be understood in reference to the accompanying drawings, in which like reference numerals refer to like parts, and in which:

DETAILED DESCRIPTION

Figure 1:
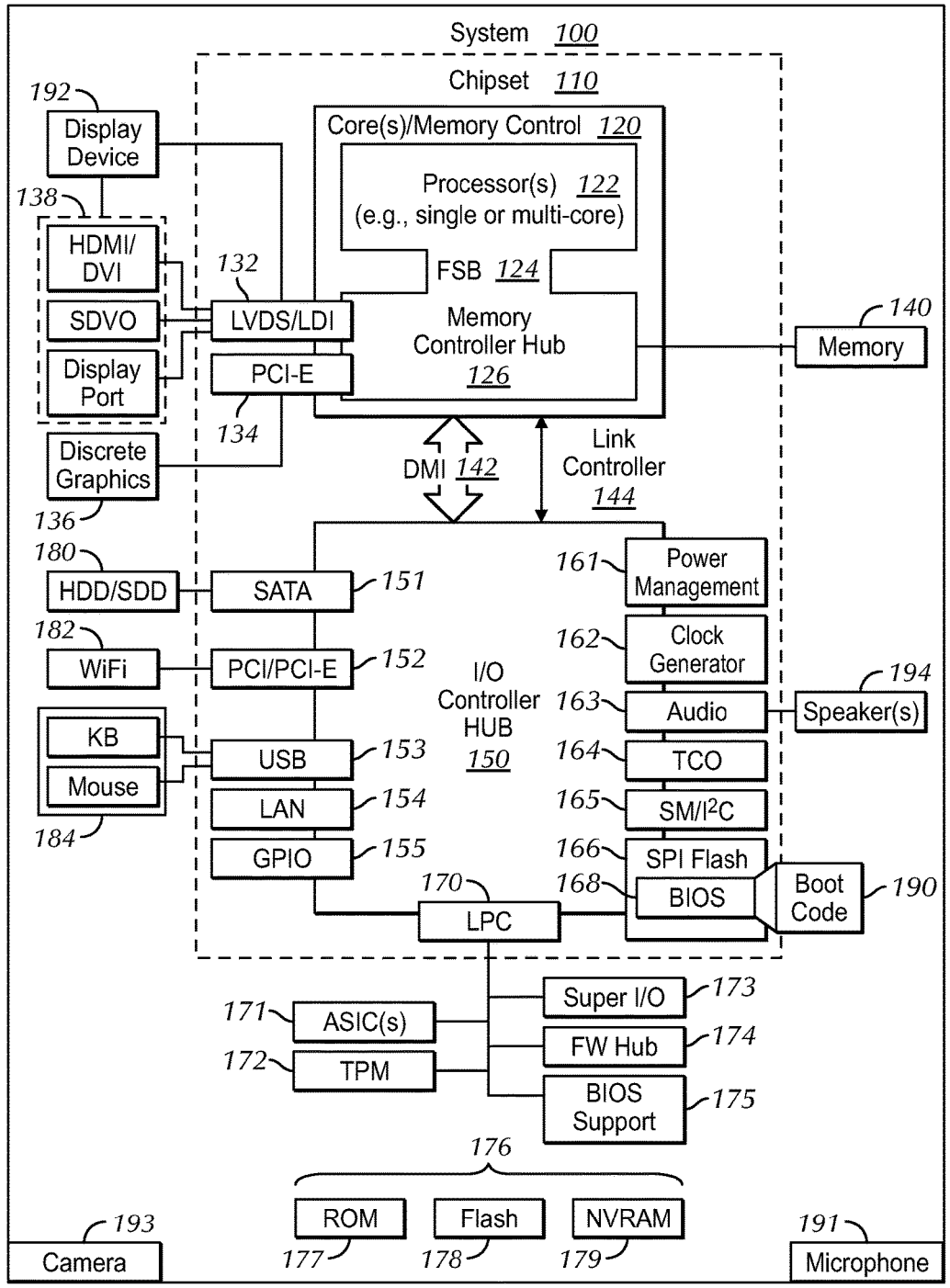
FIG. 1 is a block diagram of an example system in accordance with present principles.

The present disclosure relates to using a virtual reality (VR) and/or augmented reality (AR) apparatus in an augmented reality situation. Examples of such an apparatus include a VR/AR headset, a device having and using a holographic display, a device using Google's Project Tango, and/or a device using 3D and/or indoor mapping technology to determine the dimensions of various areas and objects therein for VR/AR purposes, etc.

After presenting a virtual reality object in a location convenient to a user, the apparatus may detect that a user is interacting with the object to control, e.g., an Internet-enabled device within the user's environment such as a smart lamp. The object may be presented based on one or more conditions being satisfied so that objects the user is not likely to interact with based on a given condition will not clutter the user's viewing space, while objects that may be relevant to a user based on the given condition are presented. For example, a virtual reality light switch to control flood lights for the user's back yard may be presented while it is dark outside but not while the sun is out.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, a virtual/augmented reality headset, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Even further, the system 100 may include an audio receiver/microphone 191 that provides input from the microphone to the processor 122 based on audio that is detected, such as via a user providing audible input/commands to the microphone 191. The system 100 may also include one or more cameras 193 that gather images and provide input related thereto to the processor 122. The cameras 193 may be thermal imaging cameras, digital cameras such as webcams, three-dimensional (3D) cameras, and/or cameras otherwise controllable by the processor 122, and integrated into and/or disposed on the system 100, to gather pictures/images and/or video such as images of a user's eyes for eye tracking purposes, images of gestures being performed by the user such as pointing at a particular item within the user's surroundings, and images of the surroundings themselves.

Additionally, though not shown for clarity, in some embodiments the system 100 may include a gyroscope that senses and/or measures the orientation of the system 100 and provides input related thereto to the processor 122, and an accelerometer that senses acceleration and/or movement of the system 100 and provides input related thereto to the processor 122. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
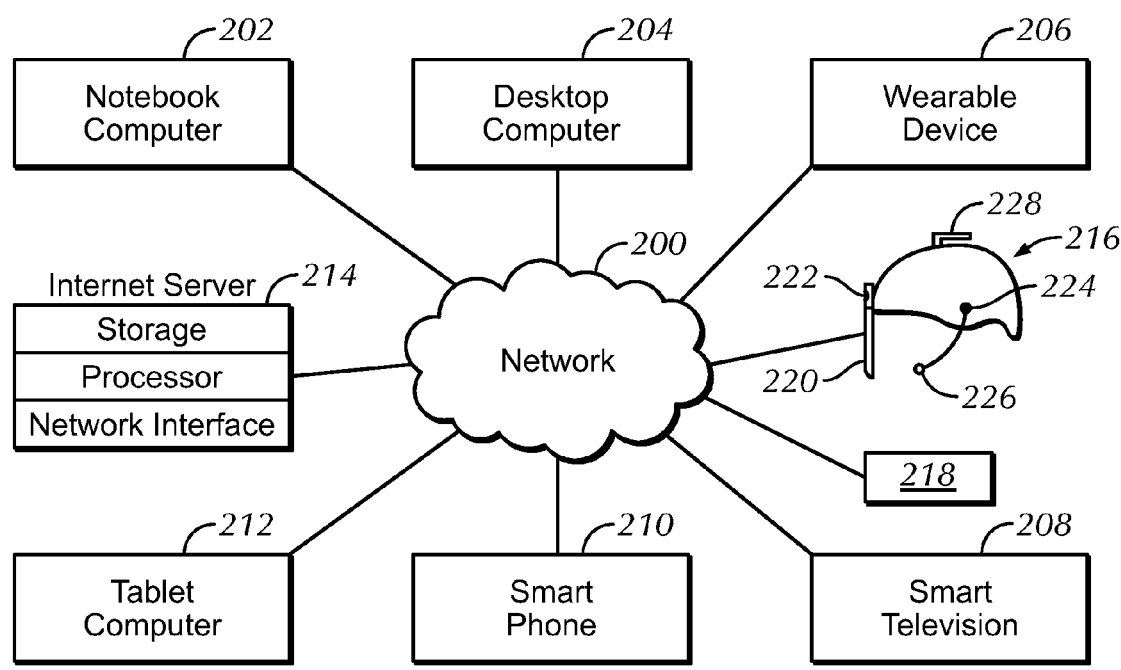
FIG. 2 is an example block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, a console 218, and a server 214 such as an Internet server that may provide cloud storage accessible to the devices 202-212, 216, and 218. It is to be understood that the devices 202-218 are configured to communicate with each other over the network 200 to undertake present principles.

Describing the headset 216 in more detail, it may include a housing to which a display device 220 is coupled for presenting virtual reality (VR) and/or augmented reality (AR) content. The display device 220 may include an at least partially transparent display through which a wearer of the headset may view real-world objects and on which the headset 216 may present virtual reality objects. The headset 216 may also include plural cameras 222 that may be similar in function and configuration to the cameras 193 described above, with at least one of the cameras oriented to image a wearer's eyes when wearing the headset 216 and another of the cameras being oriented away from the headset 216 to image gestures of the wearer and the wearer's surroundings and objects. The headset 216 may also include a microphone 224 that may be similar in function and configuration to the microphone 191, a speaker 226 that may be similar in function and configuration to the speaker(s) 194, and one or more head-engagement members 228 for a user to dispose the headset 216 on his or her head. Though not shown for clarity, it is to be understood that the headset 216 may also include a network interface for wired and/or wireless communication with the other devices of FIG. 2 such as via the Internet, a local area network (LAN), a Bluetooth network, etc.

Describing the console 218 in more detail, it may be a virtual reality and/or augmented reality console for use in conjunction with the headset 216. For instance, in addition to the headset 216 having one or more cameras for sensing eye movement of the user, for sensing gestures of the user, and for sensing objects within the environment in which the devices 216, 218 are disposed, the console 218 may also include such cameras for the same or similar purposes. The console 218 may also operate in conjunction with the headset 216 for data processing and the undertaking the computer-implemented steps, instructions, and functions described herein. Though not shown for clarity, it is to be understood that the console 218 may also include a network interface for wired and/or wireless communication with the other devices of FIG. 2 such as via the Internet, a local area network (LAN), a Bluetooth network, etc.

Figure 3:
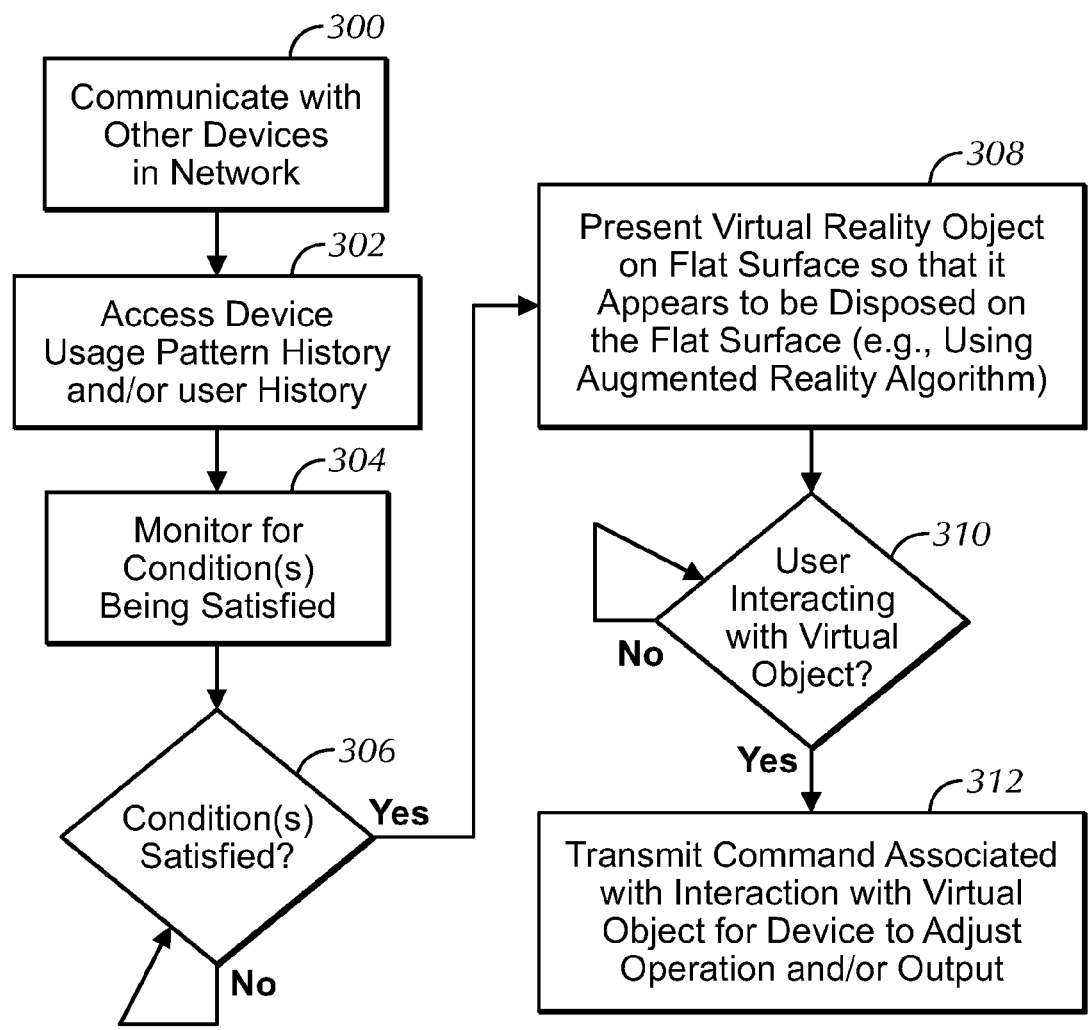
FIGS. 3-9 are flow charts of example algorithms in accordance with present principles.

Referring to FIG. 3, it shows example overall logic that may be executed by a device such as the system 100, headset 216, console 218, etc. for presenting one or more virtual reality objects that are interactable to control other devices in accordance with present principles. For convenience, the device undertaking the logic of FIG. 3 will be referred to as a headset, and indeed in at least one embodiment the logic described below may be executed in whole or in part by the headset.

Beginning at block 300, the logic communicates with other devices within a network over which it is communicating, such as a password-protected Wi-Fi network or Bluetooth network for a personal residence environment. The logic may communicate with the other devices to receive status information from those other devices on whether they are on or off, and/or information regarding other ways in which they may be functioning.

From block 300 the logic may move to block 302 where the logic may access a usage pattern history containing data that pertains to dates and times that one or more of the devices in the environment and/or connected to the network have been controlled in the past, and even particular users/headset wearers that have controlled one or more of the devices in the environment and/or connected to the network in the past. The history may be stored in cloud storage accessible to the headset, may be stored in storage on the headset itself, may be stored at another device communicating with the headset over the network, etc.

After block 302 the logic may move to block 304 where the logic may monitor for whether one or more conditions are satisfied, which may be determined based on the status information received at block 300 and/or based on the history accessed at block 302.

From block 304 the logic may move to decision diamond 306 where the logic may determine if one or more conditions are satisfied. Particular conditions will be described further below in reference to FIGS. 4-9. A negative determination at diamond 306 causes the logic to revert back to block 304 and/or continue making the determination at diamond 306 until an affirmative determination is made.

Responsive to an affirmative determination at diamond 306, the logic may proceed to block 308. At block 308 the logic may present a virtual reality object on the headset's display so that it actually appears to be disposed on a flat, unoccupied surface within the environment. The virtual reality object may be presented so that it appears in the same location on the flat surface regardless of the headset wearer moving from one position to another relative to the flat surface. This may be done using three dimensional (3D) graphics rendering algorithms and/or processing, virtual reality graphics rendering algorithms and/or processing, augmented reality graphics rendering algorithms and/or processing, etc. Notwithstanding, in accordance with present principles, such algorithms and processing may also be used to present virtual reality objects on non-flat surfaces as well, such as on the arm rest of a couch on which the headset wearer may be sitting.

From block 308 the logic may move to decision diamond 310. At diamond 310 the logic may determine whether the wearer is interacting with the virtual object, as may be determined based on input from one or more sensors such as a camera imaging gestures of the wearer, an inertial sensor sensing orientation and/or acceleration of the headset and/or another device being worn by the wearer, a position transceiver on a device such as a smart watch being worn by a wearer while the wearer gestures using the arm bearing the smart watch, etc. Thus, it is to be understood that this sensor input may be used to determine whether a portion of the wearer, such as his or her hand, is approaching or proximate to a surface on which the virtual reality object appears to be disposed to the wearer and whether the portion of the wearer is moving in one direction or another in three dimensional space to control the virtual reality object as if it was actually on the physical surface in real-world, three dimensional space on which it appears to be disposed.

A negative determination at diamond 310 causes the logic to continue making the determination thereat until an affirmative one is made. Then, responsive to an affirmative determination at diamond 310, the logic may move to block 312 where the logic may transmit a command associated with interaction with the virtual object to the device that is to be controlled. The command may be a command to adjust operation and/or output of the device to be controlled, such as light output for a lamp or temperature output for a climate control system.

Thus, for instance, suppose the device to be controlled is a smart light or another smart appliance with an on/off switch. In this example, the virtual reality object may be a virtual on/off switch for the smart appliance. The wearer may interact with the virtual on/off switch by moving his or her hand toward where the switch appears to be located to the wearer, and then by moving his or her hand up to virtually move the virtual switch from off to on, for instance. This gesture may be recognized by the headset by executing gesture recognition using images from a camera on the headset or elsewhere that is imaging the wearer's hand or arm. Responsive to recognition of this gesture, the headset may then issue a command to the smart light to adjust its light output by turning the light on.

FIGS. 4-9 show examples of logic that may be executed in conjunction with FIG. 3. For instance, the decision at the respective decision diamonds in each of these figures may be made at decision diamond 306 as described above, and the action taken at each of the respective blocks in each of these figures may be performed at block 308 as described above.

Figure 4:
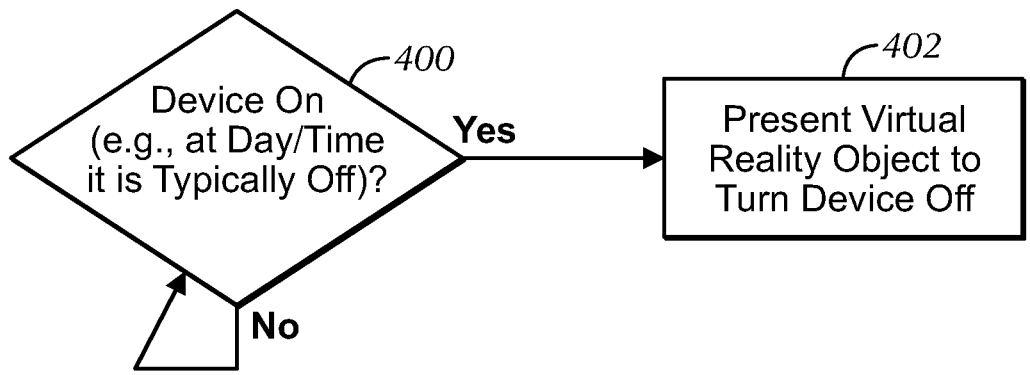

Beginning with FIG. 4, at diamond 400 the logic may determine whether the device to be controlled is powered on. In some examples, the determination may even be whether the device is powered on at a particular day and/or time during which, according to a usage history that is accessed, the device is typically powered off. "Typically" may be at least a threshold number of times during similar past days/times, the power state occurring most frequently during a most-recent number of similar days/times, etc. A negative determination at diamond 400 may cause the logic to continue making the determination thereat until an affirmative one is made. Then, responsive to an affirmative determination at diamond 400, the logic may move to block 402 where the logic may present a virtual reality object (e.g., a switch) pre-configured in the powered on position and interactable to transition it to the powered off position to turn the device off.

Figure 5:
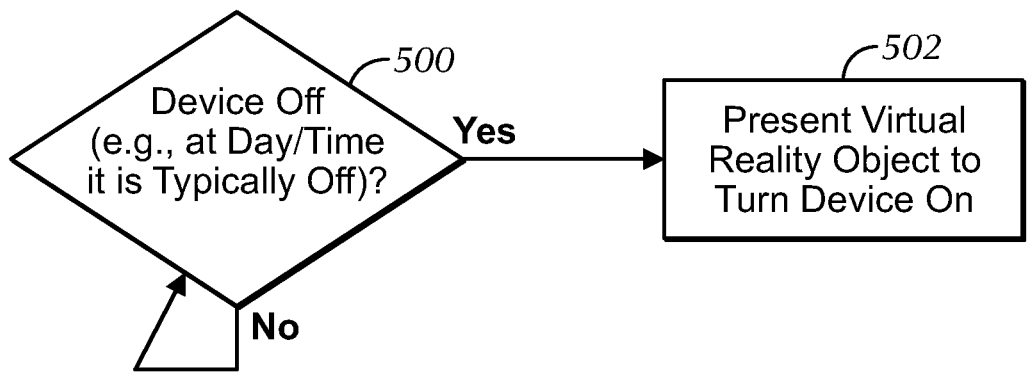

FIG. 5 shows additional example logic. At diamond 500 the logic may determine whether the device to be controlled is powered off. In some examples, the determination may even be whether the device is powered off at a particular day and/or time during which, according to a usage history that is accessed, the device is typically powered on. A negative determination at diamond 500 may cause the logic to continue making the determination thereat until an affirmative one is made. Then, responsive to an affirmative determination at diamond 500, the logic may move to block 502 where the logic may present a virtual reality object (e.g., a switch) pre-configured in the powered off position and interactable to transition it to the powered on position to turn the device on.

Figure 6:
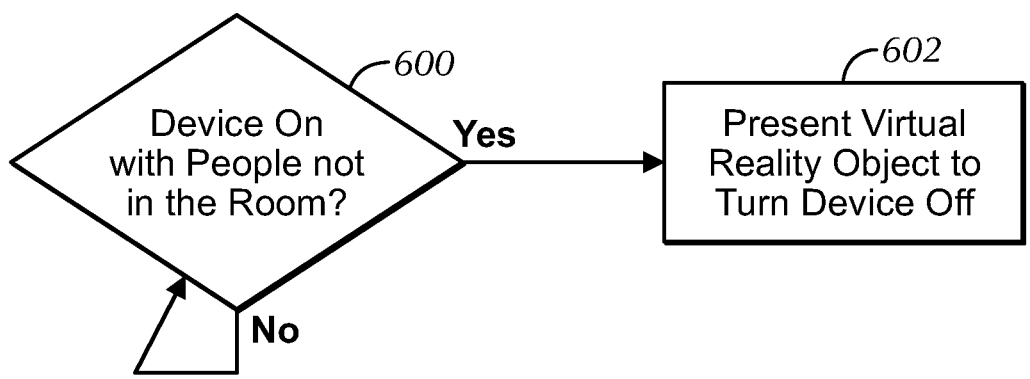

FIG. 6 shows another example of logic for use in accordance with present principles. At diamond 600 the logic may determine whether the device to be controlled is powered on with no people present in the room in which that device is disposed. People, or the lack thereof, may be identified based on images from a camera in that room that images the room, and execution of objection and/or facial recognition software on the images that are received from that camera to determine whether at least one person is present. A negative determination at diamond 600 may cause the logic to continue making the determination thereat until an affirmative one is made. Then, responsive to an affirmative determination at diamond 600, the logic may move to block 602 where the logic may present a virtual reality object (e.g., a switch) pre-configured in the powered on position and interactable to transition it to the powered off position to turn the device off since no one is in the room in which the device is disposed but the wearer of the headset or anyone else is not.

Figure 7:
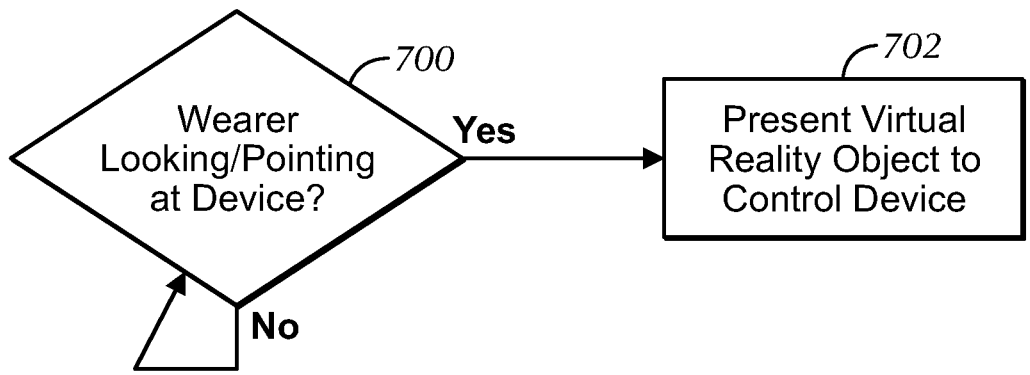

Describing FIG. 7, at diamond 700 the logic may determine whether a wearer of the headset is looking, and/or pointing (e.g., with a finger or another part of the wearer's hand), at another device within the environment. The gesture of pointing may be identified based on images from a camera that is imaging the wearer and execution of gesture recognition software on the images that are received to determine that the wearer is pointing and where. A wearer looking at the device may be identified based on images from a camera that is imaging the eyes of the wearer and execution of eye tracking software on the images that are received to determine where the wearer is looking. A negative determination at diamond 700 may cause the logic to continue making the determination thereat until an affirmative one is made. Then, responsive to an affirmative determination at diamond 700, the logic may move to block 702 where the logic may present at least one virtual reality object on a surface proximate to the wearer for controlling the device using the virtual reality object. For instance, if the device is a thermostat, virtual reality switches may be presented on an adjacent table to turn a heater on or off, and to turn an air conditioner on or off.

Figure 8:
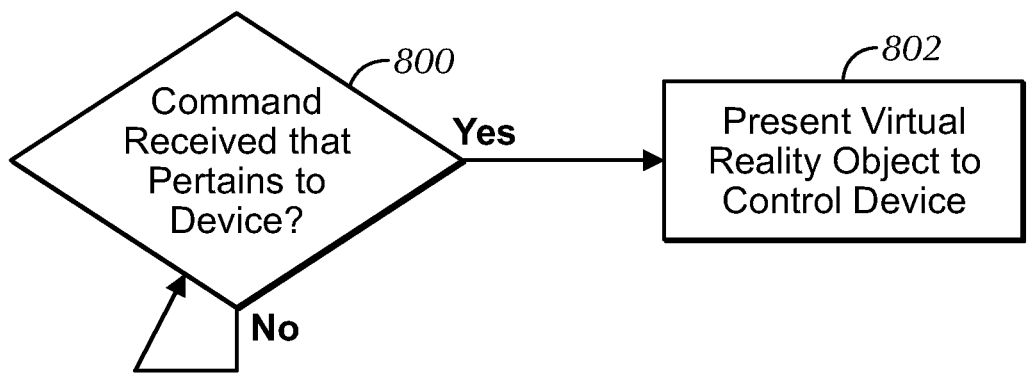

Now in reference to FIG. 8, at diamond 800 the logic may determine whether a command has been received that pertains to another device within the environment, such as a voice command received via a microphone on the headset and recognized using voice recognition software. The command may be, for instance, a command to present controls for the device and/or a command to control the device in a particular manner. A negative determination at diamond 800 may cause the logic to continue making the determination thereat until an affirmative one is made. Then, responsive to an affirmative determination at diamond 800, the logic may move to block 802 where the logic may present at least one virtual reality object for controlling the device, such as an object associated with a particular function specified in the voice command and/or all objects that the wearer may interact with to control the device.

Figure 9:
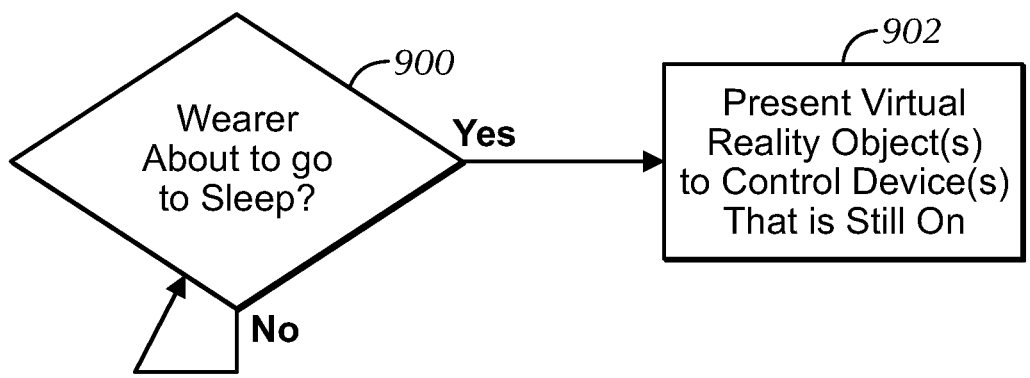

Describing FIG. 9, at diamond 900 the logic may determine whether the wearer of the headset is about to go to sleep. The determination may be made based on input from a sleep sensor sensing one or more biometrics of the wearer. The determination may also be made based on a history associated with the wearer that indicates an average time and/or various times at which the wearer has gone to sleep in the past. Thus, it may be determined whether the wearer is about to go to sleep based on data from the sleep sensor that is indicative of as much, and/or based on a threshold time occurring that is before a time at which the wearer is estimated to be going to sleep based on the data in the history. A negative determination at diamond 900 may cause the logic to continue making the determination thereat until an affirmative one is made. Then, responsive to an affirmative determination at diamond 900, the logic may move to block 902 where the logic may present at least one virtual reality object for controlling one or more device in other rooms of the same environment that are still powered on, such as a light in a common area or kitchen of the wearer's personal residence. The virtual reality object(s) may be presented at a location convenient to the wearer when about to go to bed, such as the top surface of a night stand next the wearer's bed.

Figure 10:
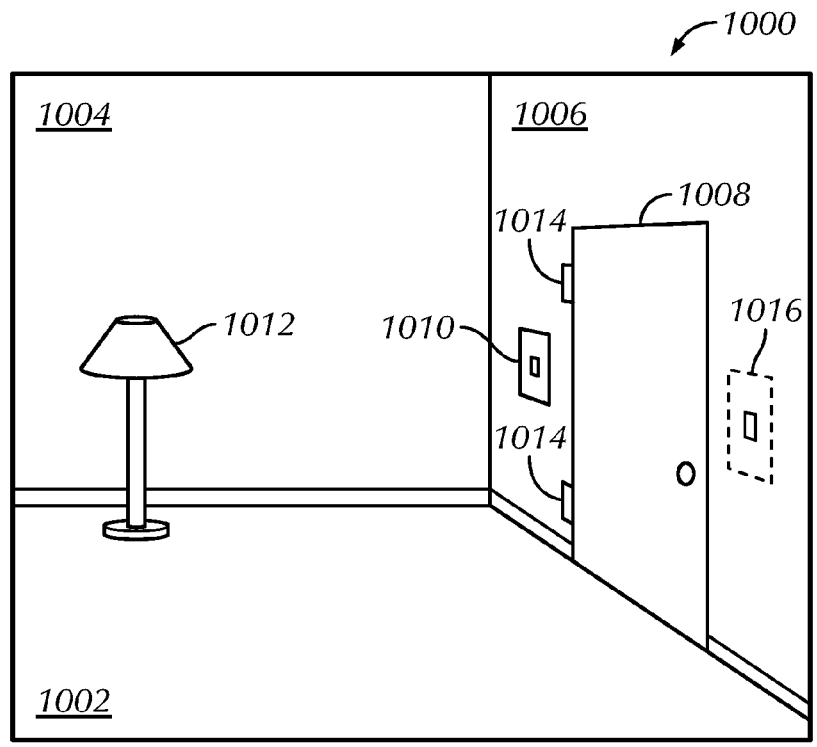
FIGS. 10 and 11 are example illustrations in accordance with present principles.

FIG. 10 is an illustration of present principles. A room 1000 has a floor 1002 and walls 1004, 1006. A door 1008 is also shown in the wall 1006, along with a real-world, actual light switch 1010 that is physically manipulable for powering on and off an Internet-enabled lamp 1012. Note that the switch 1010 is juxtaposed on the wall 1006 nearest the side of the door having hinges 1014 so when the wearer of a headset enters the room 1000 through the door 1008, the switch 1010 may be blocked by the door while the door is swung open and into the room 1000, making it inconvenient for the wearer to reach for the switch 1010 to turn on the lamp 1012.

Accordingly, based on a usage pattern of the wearer struggling to find the light switch 1010 behind the door and in the dark (e.g., not turning on the lights for at least a threshold time after entering the room 1000), the headset being worn by the wearer may, upon the wearer entering the room 1000 and/or opening the door 1008, present a virtual reality light switch 1016 on its display such that it appears to the wearer to be disposed on a flat portion/area of the wall 1006 adjacent to the opposite side of the door and that is unoccupied by items such as paintings, pictures, etc. that may otherwise be hung on the wall. The wearer may thus enter the room 1000 through the door 1008 and conveniently interact with the virtual reality light switch 1016 by mimicking a "turn on" light switch motion at the location of the wall 1006 at which the virtual light switch 1016 is represented by the headset. The headset may then detect the gesture and issue a command to the lamp 1012 to turn on.

Figure 11:
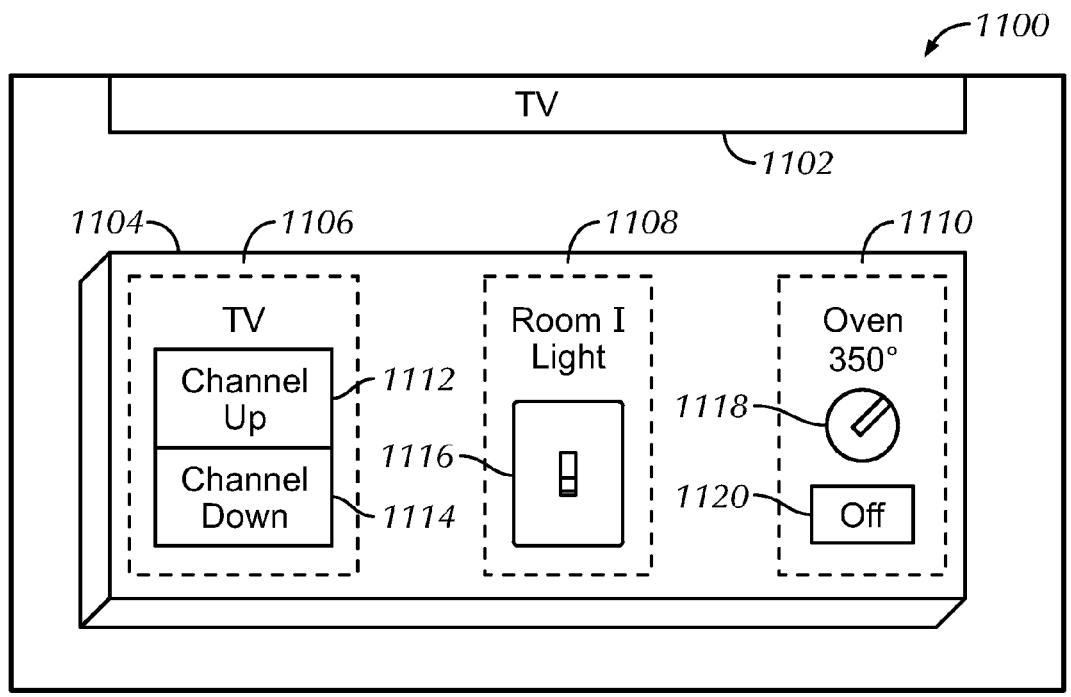

FIG. 11 is another illustration of present principles. A room 1100 has a television 1102 disposed within it, along with a coffee table 1104 having a top, flat surface on which no real-world, physical objects are currently placed. However, to the wearer of a headset viewing the coffee table 1104 through the display of an augmented reality headset, one or more control sets 1106-1110 may appear to be disposed on the top surface and in three-dimensional space based on the headset identifying that surface as flat and unoccupied by other items (e.g., as identified using images from a camera along with object recognition software and/or spatial analysis software).

For example, object recognition may be used to determine that a real-world object identified from an image has a surface that the device has been preconfigured to know is acceptable for presentation of virtual reality objects. As another example, spatial analysis may be used to determine that a real-world object identified from an image has a surface that is at least substantially flat (e.g., has a surface less than predefined curvature) and hence determine that the surface is acceptable for presentation of virtual reality objects.

The control set 1106 may be for controlling the television 1102, and accordingly a channel up button 1112 and a channel down button 1114 may appear to the wearer of the headset as if disposed on the top surface of the coffee table 1104. Though only the buttons 1112 and 1114 are shown for controlling the television, still other buttons for controlling the television may be presented, such as on and off buttons for powering the television on and off, respectively.

The control set 1108 may be for controlling a light in another room, and accordingly a light switch 1116 may also appear to the wearer of the headset as if disposed on the top surface of the coffee table 1104.

The control set 1110 may be for controlling an oven in a kitchen adjacent to the room 1100, and accordingly a temperature dial 1118 and off button 1120 may appear to the wearer of the headset as if disposed on the top surface of the coffee table 1104.

It is to be understood that each of the buttons/controls presented as if disposed on the table 1104 may be interactable by the wearer by gesturing to where the wearer observes the respective control/button to be located. Furthermore, it is to be understood that if real-world actual objects are disposed on part of the top, flat surface of the coffee table 1104, then virtual reality objects may only be presented as if disposed on other portions/areas of the top surface on which objects have not been placed.

Figure 12:
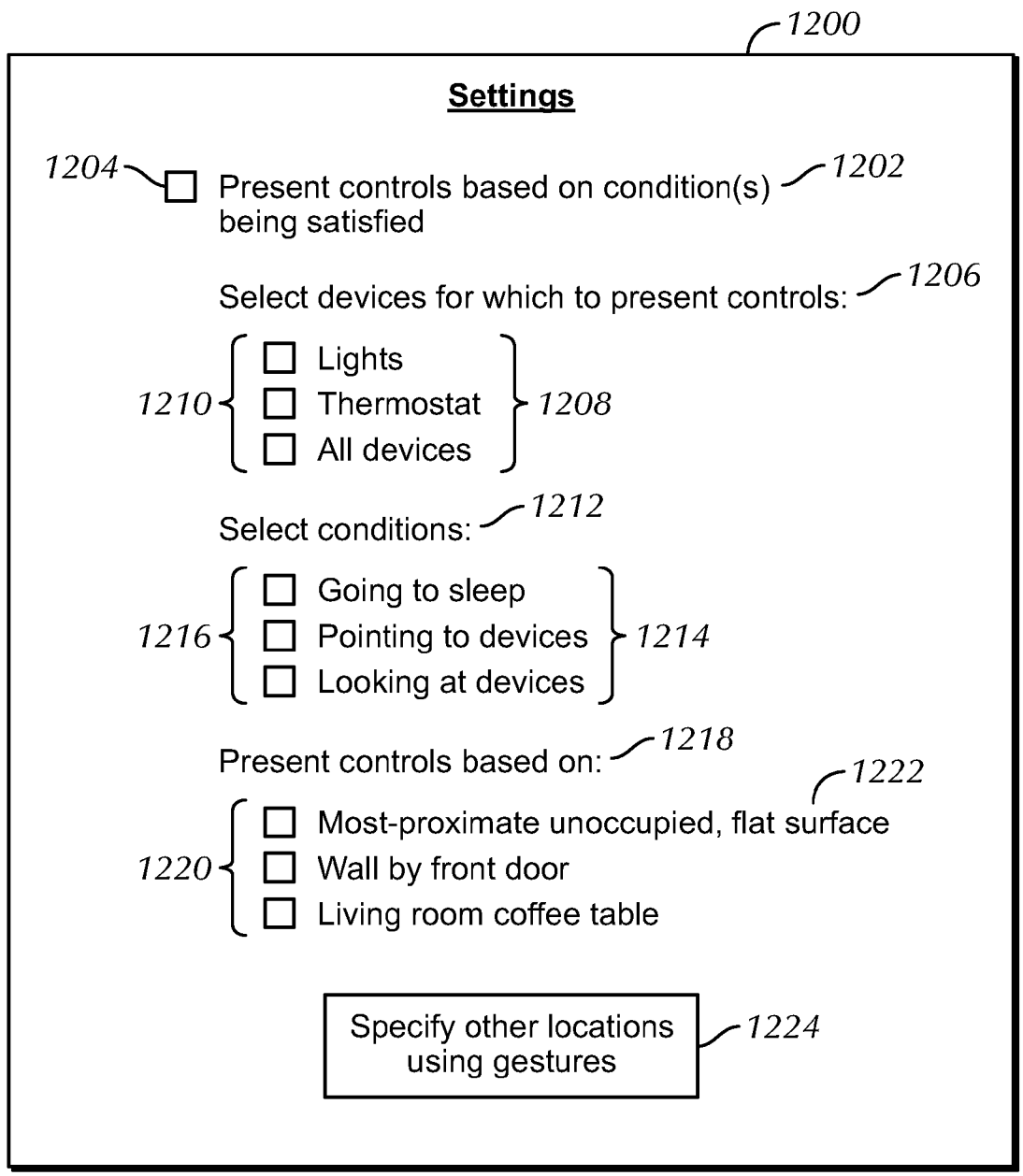
FIG. 12 is an example user interface (UI) in accordance with present principles.

Continuing the detailed description in reference to FIG. 12, it shows an example user interface (UI) 1200 presentable on a display for configuring settings of a device undertaking present principles. The UI 1200 includes an option 1202 to enable presentation of virtual reality objects/controls for one or more devices based on one or more conditions being satisfied as disclosed herein. The option 1202 is enableable by checking check box 1204.

The UI 1200 also shows a sub-option 1206 for a user to select one or more particular devices 1208 for which to present controls by checking the respective check boxes 1210 adjacent to each device 1208. Only a few devices 1208 are listed for simplicity, but any and/or all devices that are controllable may be listed.

Additionally, the UI 1200 may include a sub-option 1212 to select one or more conditions to use in accordance with present principles by checking the respective check boxes 1216 adjacent to each condition 1214. Only a few conditions 1214 are listed for simplicity, but any and/or all conditions that may be monitored may be listed.

Still in reference to FIG. 12, the UI 1200 may also include a setting 1218 for a user/wearer to preselect one or more real-world, actual surfaces in a particular environment on which the user desires virtual reality controls to be presented. Thus, prior to presentation on the UI 1200, the surfaces may have been identified by a device undertaking present principles using object recognition. Each example surface is selectable by checking the respective check box 1220 adjacent to each one.

Further, note that the first example surface 1222 is not a single actual surface per se, but rather is a type of actual surface. In particular, the type is an unoccupied, flat surface that is most-proximate to a wearer of a headset at a given time. So, for instance, if the wearer is sitting on a couch, the seat next to the wearer or the top of an adjacent coffee table may be the most-proximate surface, whereas if the wearer is leaning against a wall then the wall may be the most-proximate surface in that instance. Most proximate may be identified based on images from a camera and execution of object recognition and/or spatial analysis software, as well as based on position data received at the headset from other devices. Whether a surface is occupied or not may be determined based on execution of object recognition software using images from a camera to identify the surface and any items that may be disposed on it.

The setting 1218 may also include a selector 1224. The selector 1224 is selectable to initiate a process where a user, while wearing his or her headset, may walk about his or her environment and gesture/point to particular surfaces which the headset then recognizes and associates with being surfaces on which virtual reality objects may be presented in accordance with present principles.

Moving on from FIG. 12, it is to be understood in accordance with present principles that still other conditions may be monitored for determining whether to present a virtual reality object. For instance, weather and ambient light conditions may be used. E.g., if ambient outside light, as sensed by an ambient light sensor, is above a threshold amount, a device in accordance with present principles may not show an augmented reality light switch on a flat surface for turning on flood lights that would otherwise illuminate the outside environment.

Providing another example, if a user normally walks in to the back door of their house after work and when it is dark outside, but the back door entrance does not have an actual real-world flood light switch as the person is letting his or her dog out, the user's headset may present a virtual light switch next to other actual, real-world light switches on a wall adjacent to the door. The user may then motion to push, or toggle, the virtual light switch. By doing so, the headset may send a signal to the user's smart home system that could, in the background, actually turn on the flood lights. As another example here, the user may add, configure, or command their headset to (e.g., permanently, or always when a predefined condition is met) present a virtual light switch for the flood lights at a particular location on exterior wall of a house, given that the flood lights are outside lights.

It may now be appreciated that present principles provide for creating virtual objects in convenient areas of the user's virtual/real-world space. By manipulating these virtual objects, a user can modify operation of real world objects. This may be done, for example, from within a smart home environment, where users can electronically and remotely turn on or off devices, appliances, etc. in their residence. Furthermore, in some embodiments the user may create switches, buttons, or any number of virtual objects that are to be presented (and even designate particular locations at which they are to be virtually presented) in order to manipulate one of the connected devices.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. An apparatus, comprising:
   a housing;
   at least one processor coupled to the housing;
   a display coupled to the housing and accessible to the at least one processor; and
   storage coupled to the housing and accessible to the at least one processor, the storage bearing instructions executable by the at least one processor to:
   determine that at least one condition is satisfied for presentation of a virtual reality object to control a device different from the apparatus; and
   responsive to the determination, present the virtual reality object on the display so that the virtual reality object appears to a user, while viewing the display, to be within arms-reach of the user relative to a current location of the user by presenting the virtual reality object on the display so that it appears to be disposed on an actual surface in three-dimensional space that is within arms-reach of the user relative to the current location of the user, the actual surface being different from the display, wherein a first portion of the actual surface is selected by the apparatus for use to present the virtual reality object based on identification of a real-world object as already being disposed at a second portion of the actual surface that is different from the first portion.

2. The apparatus of claim 1, wherein the at least one condition comprises that no one is present in the room in which the device is disposed.

3. The apparatus of claim 1, wherein the at least one condition comprises at least one of a particular day and a particular time of day.

4. The apparatus of claim 1, wherein e condition comprises that the user is looking at the device.

5. The apparatus of claim 1, wherein the condition comprises at least one of: receipt of a voice command from the user, the user pointing at the device.

6. The apparatus of claim 1, wherein the virtual reality object is a virtual switch to turn the device at least one of on and off.

7. The apparatus of claim 1, wherein the instructions are executable by the at least one processor to:
transmit a command to the device to adjust operation of the device, the command transmitted based on detection of the user as interacting with the virtual reality object.

8. The apparatus of claim 1, wherein the apparatus is an augmented reality headset and wherein the virtual reality object at least in part establishes augmented reality content presented via the augmented reality headset.

9. The apparatus of claim 1, wherein the apparatus is a virtual reality headset and wherein the virtual reality object at least in part establishes virtual reality content presented via the virtual reality headset.

10. The apparatus of claim 1, herein the instructions are executable to:
present a graphical user interface (GUI), the GUI comprising an option that is selectable to enable the apparatus to present virtual reality objects so that they appear to be within arms-reach, the presentation of virtual reality objects so that they appear to be within arms-reach otherwise not being enabled.

11. The apparatus of claim 1, wherein the virtual reality object comprises a switch, and wherein the switch is presented so that it reflects a current operational state of the device so that if the device is powered on then the switch will indicate, prior to user interaction with the switch subsequent to its presentation, that the device is powered on and so that if the device is powered off then the switch will indicate, prior to user interaction with the switch subsequent o its presentation, that the device is powered off, the apparatus not indicating more than one operational state of the device at the same time.

12. A method, comprising:
determining that at least one condition is satisfied for presentation of a virtual reality object on a display of a first device, the virtual reality object being interactable to control output from a second device;
presenting, responsive to the determining, the virtual reality object on the display so that the virtual reality object appears to a user, while viewing the display, to be within reach of the user relative to a current location of the user by presenting the virtual reality object on the display so that the virtual reality object appears to be disposed on an actual surface in three-dimensional space that is within reach of the user relative to the current location of the user, the actual surface being different from the display, wherein a first portion of the actual surface is selected for presentation of the virtual reality object based on identification of a real-world object as already being disposed at a second portion of the actual surface that is different from the first portion;
identifying user interaction with the virtual reality object; and
controlling, responsive to the identifying, output from the second device.

13. The method of claim 12, wherein the at least one condition comprises that the user is about to go to sleep.

14. The method of claim 12, wherein the virtual reality object is a button.

15. The method of claim 12, comprising:
presenting a graphical user interface (GUI), the GUI comprising an option that is selectable to enable the first device to present virtual reality objects so that they appear to be within reach, the function of using the first device for presentation of virtual reality objects so that they appear to be within reach otherwise not being enabled.

16. An apparatus, comprising:
a first processor;
a network adapter; and
storage bearing instructions executable by a second processor for:
determining that at least one condition is satisfied for presentation, on a display of an apparatus, of a virtual reality object to control a device different from the apparatus;
identifying a surface, the surface being different from the display; and
presenting, based on the determining and based on the identifying, the virtual reality object on the display so that the virtual reality object appears to a user, while viewing the display, to be disposed on the surface, wherein a first portion of the surface is selected for use to present the virtual reality object based on identification of a real-world object as already being disposed at a second portion of the surface that is different from the first portion;
wherein the first processor transfers the instructions to the second processor over a network via the network adapter.

17. The apparatus of claim 16, wherein the instructions are executable by the second processor for:
transmitting a command to the device to adjust operation of the device, the command transmitted based on detection of the user as interacting with the virtual reality object.

* * * * *